No. 732,103. Patented June 30, 1903.

UNITED STATES PATENT OFFICE.

BENJAMIN CUSHING MUDGE, OF LYNN, MASSACHUSETTS, ASSIGNOR TO LINEN MANUFACTURING COMPANY, OF BOSTON, MASSACHUSETTS, A CORPORATION OF MAINE.

FLAX STOCK AND METHOD OF PREPARING SAME.

SPECIFICATION forming part of Letters Patent No. 732,103, dated June 30, 1903.

Application filed July 7, 1902. Serial No. 114,683. (Specimens.)

*To all whom it may concern:*

Be it known that I, BENJAMIN CUSHING MUDGE, a citizen of the United States, and a resident of Lynn, in the county of Essex and State of Massachusetts, have invented new and useful Improvements in Flax Stock and Method of Preparing the Same, of which the following is a specification.

My invention relates to the manufacture of flax, and especially to the production of flax fiber for use in paper-making, for textile purposes, absorbent linen, or other products; and, as below described, it consists of a process or method and the product thereof.

More particularly, my invention is characterized by the transformation or removal, or both, from the flax fiber of those portions of the flax plant or stalk known in the art as "shives."

While my invention and improvements are applicable to the treatment of flax generally, I have for the most part heretofore applied them to the treatment of flax waste or flax "tow," which consists of the shorter flax fibers, interspersed and entangled with bits of shive, more or less troublesome and refractory, according to their size, shape, and quantity. It is in its effect upon flax waste or flax tow that my invention has perhaps its most significant expression, for the reason that the product resulting from my new process as applied to flax is wholly new industrially, and by the operation of my invention in this particular direction a new industry is in process of development and increase.

Heretofore a considerable quantity of flax waste or tow has been imported into the United States, where it has found utilities of limited scope. It has been used as a filling for cheap cushions and upholstery and to some extent as an ingredient in the manufacture of the coarser grades of pasteboard. Flax waste when treated by my new process becomes a new product, capable of such valuable applications as the manufacture of all grades of paper, from the finest and toughest linen paper downward, and the manufacture of linen threads, textile fabrics, and absorbent and non-absorbent linen. Moveover, the operation of my invention opens a market for the immense quantities of wasted flax, which in this country is burned for want of useful application.

In the United States large quantities of flax are grown for the seed and after the seed is obtained the flax-stalks, which contain all the linen fiber, are burned. Even if it were not available for textile manufacture in this country all this wasted flax contains a large proportion of fiber of the greatest value in linen-paper making if it could be furnished free from the stalk and straw-like portions which constitute the shives. As my new process relates to the reduction and removal of shives and stalk fragments from flax fiber and accomplishes this desirable result readily and economically, it is clear that the flax material now wasted will presently find a useful and profitable market.

At the present time flax waste or tow is the most easily obtainable form of flax fiber, and I will therefore describe my process and product with reference to flax waste. I desire, however, that it be clearly understood that my process and product are by no means limited to this special application and that the treatment of flax waste is used as the best present available illustration. My invention is applicable to the treatment of flax generally and such general application is contemplated in my claims.

Flax waste as it comes to market is a matted mass of linen fiber containing entangled within it the shives which appear as bits of stick and straw. It is possible to remove part of these sticks and straws mechanically; but the finer pieces of shive, which remain after the most vigorous mechanical treatment, are sufficiently large to constitute a serious obstacle to the use of the fiber in paper-making or in spinning. As a useful preliminary step in my process I subject the flax waste to the action of a carding-machine, using any suitable carding-machine, which removes and separates from the linen fiber all the larger and heavier parts of the shives and delivers the flax fiber in a much-improved condition. The fiber contains, however, an innumerable quantity of small shive fragments, many of them large enough to be seen, but all so closely enmeshed in the flax fiber that mechanical devices are insufficient to remove or sensibly affect them. Besides freeing the fiber of the coarser parts of the shive the carding-machine opens out and "fluffs" the fiber, leaving it in excellent condition for the remaining steps of my process. The mechanical extraction of shives from the fiber being accomplished, it remains to perform the chemical process. This may in part actually remove the shives from the fiber; but for the most part I believe that the chemical treatment improves the fiber by dissolving the cementitious portions of the shives, thus disintegrating the cellular parts of the shive and dispersing them among the flax fibers, where, by reason of their smallness, the shive fibers are imperceptible.

I take the fiber as delivered by the machine as aforesaid and as a preparation for the more essential steps in the process wash it in a weak soap solution, preferably rendered mildly alkaline with soda-ash (ten per cent. in bulk of water) at a temperature not higher than 75° centigrade. About 70° centigrade is a proper temperature. Then I rinse the fiber before proceeding to the next stage. This washing and rinsing may be dispensed with. I merely recommend it as a preparatory measure. I next treat the fiber with a solvent of the non-cellulose components of the shives. The shive is of a compound cellulose structure, wherein the cellulose portions or fibers are joined one to the other by the cementitious and highly-complex carbonaceous substances, being wax-like or gummy components of the woody or straw-like fragments, such as lignin, pectose, resins, &c. When these cementitious substances are dissolved or deprived of their binding effect, the cellulose fibers readily fall apart and are dispersed by whatever mechanical action is brought to bear. I have tried a number of disintegrators or solvents with varying degrees of success, and I find that an excellent solvent for the purpose is a warm solution of caustic alkali, such as caustic soda, at about 3° Twaddell and a mixture therewith of carbonate of soda, (soda-ash,) using about one part soda-ash to two parts caustic, by weight, when dry. The addition of the carbonate I find tends to prevent the fiber from shriveling in the process of treatment, thereby improving the product. After the fiber has remained in this warm caustic alkaline solution about an hour, during which time it may with good effect be mechanically agitated, I wash it in clear water. This washing need not be thorough, for the reason that the subsequent operations are assisted by the retention of some of the caustic alkali. I recommend also that the above caustic-alkali treatment be carried on in a closed vessel or digester at a pressure not exceeding twenty pounds to the square inch, and if carried on in an open vessel at a temperature not exceeding 185° Fahrenheit. I have found that at temperatures higher than this the caustic bath is apt to make the linen fibers too tender. The result of this caustic-alkali stage or shive-loosening operation will be observed as follows: The finest pieces of shive have disappeared and the larger pieces are much reduced in size. The whole mass is bleached somewhat, and the remaining perceptible fragments of shive are very loose in texture, friable, and easily separated. Mechanical attrition has a marked effect on the remaining shives, which are, in brief, prepared for the final dispersion of their fibers, some or all of which may remain in the flax, but in such condition as to be imperceptible. After this alkaline treatment, which may be termed a "disintegrating" treatment and which, it is believed, leaves the lignin in whole or in part undissolved in the shives, I proceed to the bleaching. The actual bleaching effect of these stages in my process is of value in preparing the fiber for the manufacture of fine paper or for spinning, as it whitens the product. The bleaching, as I carry it on, however, has, I believe, the accompanying effect of completing the disintegration of the shives by forming chlorids with the lignin, which are then soluble in alkali. The earlier stage, wherein the caustic solution is used, leaves part of the shive in a perceptible condition, but softens it, loosens its fibers, and renders it susceptible to the further and later treatment. A good bleaching solution may be composed of three parts chlorid of lime, two parts sulfate of magnesia, and one part carbonate of soda, by weight, dissolved in water to a solution at about 5° Twaddell. Care should be taken to allow this liquor to settle. Then the scum should be removed and only the clear liquor used. I soak the fiber in the bleaching liquor, preferably at not over 100° Fahrenheit, for two hours or more, according to the initial color of the fiber, with constant mechanical agitation, until the bleaching liquor is spent, or nearly so. I next wash the fiber with clear water and then proceed to sour it in a solution of acetic acid (sulfuric or hydrochloric acid will serve) from 2° to 3° Twaddell and at the temperature of the atmosphere. The souring should be accomplished in from one to two hours. It should be watched with care and terminated if the fiber shows signs of becoming tender. The acid may then be washed away with clear water, or the washing may be dispensed with, and the acid will be neutralized by the subsequent alkaline treatment. The fiber is then placed in a solution of carbonate of soda at 3° Twaddell. This neutralizes any acid which may remain in the fiber, also assists in the bleaching, and dissolves the remaining lignin, ligno-cellulose, &c., which have been rendered soluble by the bleaching treatment. If taken out of the acid-bath and allowed to stand without neutralizing, the fiber will be reduced to a powder. This last alkaline solution may be used boiling hot with good effect and under pressure, preferably not exceeding twenty pounds to the square inch. This treatment should be continued for about one hour. Then I wash the fiber again with clear water, and if the purposes to which it is to be applied require a very fine product free from any perceptible shive fragments I repeat the bleaching treatments in the order above named, using weaker solutions than at first.

I have found that the bleaching part of my process is facilitated and the final product improved by the addition of an anilin blue in small quantity during the next to the last alkaline treatment. This blue should be worked out by washing and subsequent weak alkaline treatments, (as with carbonate of soda,) followed by weak acid washing, and finally a weak soap and soda-ash bath and a rinsing in clear water.

The product resulting from this process is a fine white linen fiber, clear of all perceptible shives, but containing within its mass the separated, softened, and bleached shive fibers, which might be detected by the microscope, but which are so fine and soft in texture and so well bleached that their presence is not practically sensible either in the fiber or in the paper or cloth made therefrom. From this fiber the finest linen paper can be made, as the fiber is better and of more uniform quality than even the most carefully-selected rag-stock.

In order to set forth the specific process above described, which embodies my invention so far as process is concerned, I here arrange in tabular form the successive steps. Starting with flax waste from which the shive has been stripped or combed mechanically as far as practicable, I treat the same as follows:

1. Wash in a weak solution of soap and soda-ash at a temperature about 70° centigrade.
2. Treat for about two hours in a warm 3° Twaddell solution of soda-ash and caustic soda, one part soda-ash to two parts caustic. The temperature should not rise above 180° Fahrenheit.
3. Wash in clear water, not necessarily with thoroughness.
4. Treat for two hours and upward in a hot solution, 5° Twaddell, of chlorid of lime, three parts; sulfate of magnesia, two parts, and soda-ash, one part. One part caustic soda may also be used with good results. Only the clear liquor of this solution should be used. This treatment may be carried on at any temperature preferably under 100° Fahrenheit and should be continued until the liquor is nearly or quite spent.
5. Wash with clear water.
6. Sour with a solution of acetic acid (or sulfuric or hydrochloric acid,) 2° to 3° Twaddell, at ordinary temperature. Be careful not to allow this souring to continue long enough to make the fiber tender. One to two hours should suffice.
7. Wash with clear water.
8. Treat with a weak alkaline solution, such as a soda-ash solution, boiling hot, at 3° Twaddell.
9. Wash with clear water.

The steps from 4 to 9, inclusive, may be repeated if a very thorough bleach is desired. On repetition the strength of all the solutions should be reduced. The extent of reduction lies largely within the discretion of the person in charge, who will gage his treatment with an eye to the result sought. In all these stages of treatment it is desirable to agitate the fiber mechanically.

The above process has yielded good results, due, as I believe, to three characteristic effects: first, the disintegration and separation of the shive fibers; second, the whitening or bleaching of these fibers along with the flax fiber, and, third, the dissolution of the gummy substances, which cling to the flax fibers themselves. I regard these three effects as important in the order in which I state them. The disintegration and separation of the shive fibers, which are short cellulose woody fibers, renders them so small that they are easily worked into paper or yarn without making any lumps or breaks therein. Conceivably this disintegration might be carried out by means of a gum solvent which has no appreciable bleaching effect, leaving the flax fiber ready to be made into dark-colored and coarse papers, like Manila paper, or spun into unbleached yarn, as for toweling. The bleaching effect is, however, an accompaniment of what I believe to be the best mode of disintegrating the shive fibers, so that the two effects progress together. The same solvents which reduce the cementitious matter in the shive, so that its fibers are free to separate, also cleanse the flax from adherent gum and soften the resulting product.

In using solvents calculated to disintegrate the shives and disperse their fibers care should be taken to reduce the strength of the solvents to a point where they have no sensible effects upon the flax fibers themselves. It is of importance also to observe the effect of prolongation of treatment on the fiber, so as to ascertain with each gum solvent how long it is safe to persist in a treatment having in view the preservation of the flax fibers. The solution of a solvent for the purpose of disintegrating the shive should be guided by several considerations. The disintegration of the shive itself follows the solution or decomposition of the woody substances, non-cellular but cementitious, which bind together the cellulose fibers of the shive. This decomposition is analogous to the effect of wood-fiber digestion as carried on in the wood pulp and paper manufacture. Were the shive straws and woody fragments alone to be subjected to treatment, perhaps the very process of wood-fiber digestion would serve for shive, but this is not the condition. The shive is intimately and inextricably mixed with the valuable flax fiber. The shive itself is of no value, nor is it present in appreciable quantity to form a valuable product in itself. The sole reason for its treatment is that it should disappear as shive and be present only in the shape of harmless isolated fibers interspersed with the flax fiber, which is the truly valuable product. Hence the treatments should be tempered to preserve the flax, while of sufficient rigor to disintegrate the shive. Mechanical agitation of the fibrous mass hastens the final result and also assists in dispersing the disintegrated and separated shive fibers throughout the fibrous mass.

What I claim, and desire to secure by Letters Patent, is—

1. Flax fiber having incorporated within its mass disintegrated and dispersed shive fibers.

2. Flax tow wherein the shives are disintegrated and separated into isolated fibers, both the flax and shive fibers being bleached.

3. Flax fiber having incorporated within its mass disintegrated and dispersed shive fibers, the latter being free from gummy, wax-like, resinous, and like cementitious matter.

4. Flax fiber having incorporated within its mass disintegrated and dispersed shive fibers, the latter being free from gummy, wax-like, resinous, and like cementitious matter, both the flax fibers and the shive fibers being bleached.

5. The method of freeing flax fiber from shives which consists in disintegrating and dispersing the component fibers of the shives.

6. The method of freeing flax fiber from shives, which consists in treating the shive-containing fibrous mass with a solvent of the non-cellular parts of the shives.

7. The method of freeing flax fiber from shives, which consists in treating the shive-containing fibrous mass with a solvent of the cementitious portions of the shive and separating the component fibers of the shive.

8. The method of freeing flax fiber from shives, which consists in treating the shive-containing fibrous mass with a solvent of the cementitious portions of the shive, separating the component fibers of the shive and dispersing them through the mass of fiber.

9. The method of freeing flax fiber from shives, which consists in treating the shive-containing fibrous mass with a solvent of the non-cellular parts of the shives, and agitating the fibrous mass to disperse therethrough the separated shive fibers.

10. The method of freeing flax fiber from shives, which consists in treating the shive-containing fibrous mass with a solvent of the cementitious portions of the shive, and separating the component fibers of the shive, and bleaching the fibrous mass.

11. The method of freeing flax fiber from shives, which consists in mechanically stripping the larger shive fragments from the shive-containing mass of fiber, and thereafter disintegrating and dispersing the component fibers of the remaining smaller shives.

12. The method of freeing flax fiber from shives, which consists in mechanically stripping the larger shive fragments from the shive-containing mass of fiber, and thereafter treating the mass of fiber containing the smaller shives with a solvent of the non-cellular portions of the shives, thus separating the component fibers of the shives.

13. The method of freeing flax fiber from shives, which consists in mechanically stripping the larger shive fragments from the shive-containing mass of fiber, and thereafter treating the mass of fiber containing the smaller shives with a solvent of the cementitious portions of the shives, thus separating the component fibers of the shives, and agitating the mass to disperse therethrough the separated shive fibers.

14. The method of freeing flax fiber from shives, which consists in mechanically stripping the larger shive fragments from the shive-containing mass of fiber and thereafter treating the mass of fiber containing the smaller shives with a solvent of the cementitious portions of the shives, and bleaching the fibrous mass.

15. The method of freeing flax fiber from shives, which consists in carding the shive-containing mass of fiber and thereafter treating the carded mass of fiber with a solvent of the cementitious portions of the shives, thus separating the component fibers of the shives.

16. The method of freeing flax fiber from shives, which consists in carding the shive-containing mass of fiber and thereafter treating the carded shive-containing mass of fiber with a solvent of the cementitious portions of the shives, thus separating the component fibers of the shives, and agitating the mass to disperse therethrough the separated shive fibers.

17. The method of freeing flax fiber from shives, which consists in carding the shive-containing mass of fiber, and thereafter treating the carded shive-containing mass of fiber with a solvent of the cementitious portions of the shives, and bleaching the fibrous mass.

18. The method of freeing flax fiber from shives, which consists in treating the shive-containing mass of fiber with an alkali thus disintegrating the shives and separating their component fibers.

19. The method of freeing flax fiber from shives, which consists in treating the shive-containing mass of fiber with an alkali, thus disintegrating the shives and separating their component fibers, and agitating the mass to disperse therethrough the separated shive fibers.

20. The method of freeing flax fiber from shives, which consists in treating the shive-containing mass of fiber with an alkali, and bleaching the fibrous mass.

21. The method of freeing flax fiber from shives, which consists in mechanically stripping the larger shive fragments from the shive-containing mass of fiber and thereafter treating the mass of fiber containing the smaller shives with an alkali, thus separating the component fibers of the shives.

22. The method of freeing flax fiber from shives, which consists in mechanically stripping the larger shive fragments from the shive-containing mass of fiber, and thereafter treating the mass of fiber containing the smaller shives with an alkali, thus separating the component fibers of the shives, and agitating the mass to disperse therethrough the separated shive fibers.

23. The method of freeing flax fiber from shives, which consists in mechanically stripping the larger shive fragments from the fiber, and thereafter treating the mass of fiber containing the smaller shives with an alkali, and bleaching the fibrous mass.

24. The method of freeing flax fiber from shives, which consists in treating the shive-containing mass of fibers with caustic soda thereby separating the component fibers of the shives.

25. The method of freeing flax fiber from shives, which consists in treating the shive-containing mass of fiber with caustic soda thereby separating the component fibers of the shives, and agitating the mass to disperse therethrough the separated shive fibers.

26. The method of freeing flax fiber from shives, which consists in treating the shive-containing mass of fibers with caustic soda thereby separating the component fibers of the shives, and bleaching the fibrous mass.

27. The method of freeing flax fiber from shives, which consists in treating the shive-containing mass of fiber with caustic soda and soda-ash.

28. The method of freeing flax fiber from shives, which consists in treating the shive-containing mass of fiber with caustic soda and soda-ash, and agitating the mass to disperse therethrough the separated shive fibers.

29. The method of freeing flax fiber from shives, which consists in treating the shive-containing mass of fiber with caustic soda and soda-ash, and bleaching the fibrous mass.

30. The method of freeing flax fiber from shives, which consists in treating the shive-containing mass of fibers with a solvent of the cementitious portions of the shives, thus separating the component fibers of the shives and bleaching the fibrous mass with a solution of chlorid of lime.

31. The method of freeing flax fiber from shives, which consists in treating the shive-containing mass of fibers with a solvent of the cementitious portions of the shive, thus separating the component fibers of the shives and bleaching the fibrous mass with a solution of chlorid of lime and sulfate of magnesia.

32. The method of freeing flax fiber from shives, which consists of treating the shive-containing mass of fiber with caustic soda and bleaching the fibrous mass with a chlorid-of-lime bleaching mixture.

33. The method of freeing flax fiber from shives, which consists of treating the shive-containing mass of fiber with a weak solution of caustic alkali, and thereafter bleaching the mass with an alkaline bleach.

34. The method of freeing flax fiber from shives, which consists in treating the shive-containing mass of fiber with successive baths containing in weak solution a solvent of the gummy, wax-like, resinous and like parts of the shives.

35. The method of freeing flax fiber from shives, which consists of treating the shive-containing mass of fiber with successive baths containing in weak solution a solvent of the gummy, wax-like, resinous and like parts of the shives, and bleaching the mass.

36. The method of preparing flax from flax tow which consists in treating the shive-containing mass of tow with a weak solution of caustic soda, bleaching the mass with a weakly-alkaline chlorid-of-lime bleach, and thereafter treating the mass with a weak alkaline solution.

37. The method of preparing flax from flax tow which consists in treating the shive-containing mass of fiber with a weak solution of caustic soda, bleaching the mass with a weakly-alkaline chlorid-of-lime bleaching mixture, and thereafter treating the mass one or more times with a weak alkaline solution, bluing the mass with an anilin blue during one of the last-mentioned alkaline treatments.

38. The method of preparing flax from flax tow, consisting in treating the shive-containing mass of flax tow with a solution of caustic soda and soda-ash, bleaching said tow with a solution of chlorid of lime, sulfate of magnesia and soda-ash, souring with an acid solution and treating with an alkali solution, substantially as described.

39. The method of preparing flax from flax tow, consisting in mechanically stripping the larger shive fragments from the shive-containing mass of tow, and thereafter treating the shive-containing mass of flax tow with a solution of caustic soda and soda-ash, bleaching said tow with a solution of chlorid of lime, sulfate of magnesia and soda-ash, washing with clear water, souring with a solution of acetic or other acid, again washing with water, treating with solution of soda-ash, and again washing in water, substantially as described.

40. The method of preparing flax from flax tow consisting in loosening and partially uncementing the component fibers of the shives by means of a solvent of the cementitious portion of the shives, and thereafter simultaneously bleaching and completing the disintegration of the shives.

Signed by me at Boston, Massachusetts, this 2d day of July, 1902.

BENJAMIN CUSHING MUDGE.

Witnesses:
ROBERT CUSHMAN,
FRANK S. HARTNETT.